US012401961B2

(12) United States Patent
Sung

(10) Patent No.: US 12,401,961 B2
(45) Date of Patent: Aug. 26, 2025

(54) AUDIO CONTROL DEVICE AND METHOD OF CONTROLLING MULTI-CHANNEL SOUND SYSTEM

(71) Applicant: REALTEK SEMICONDUCTOR CORPORATION, Hsinchu (TW)

(72) Inventor: Lien-Hsiang Sung, Hsinchu (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 199 days.

(21) Appl. No.: 17/972,156

(22) Filed: Oct. 24, 2022

(65) Prior Publication Data

US 2023/0125157 A1 Apr. 27, 2023

(30) Foreign Application Priority Data

Oct. 27, 2021 (TW) ................................ 110139949

(51) Int. Cl.
*H04S 7/00* (2006.01)
*G10L 19/008* (2013.01)
*H04R 5/02* (2006.01)
*H04R 5/04* (2006.01)
*H04S 3/00* (2006.01)

(52) U.S. Cl.
CPC ............ *H04S 7/301* (2013.01); *G10L 19/008* (2013.01); *H04R 5/02* (2013.01); *H04R 5/04* (2013.01); *H04S 3/008* (2013.01); *H04S 2400/01* (2013.01); *H04S 2400/15* (2013.01)

(58) Field of Classification Search
CPC ...................................................... H04S 7/301
See application file for complete search history.

(56) References Cited

U.S. PATENT DOCUMENTS

2007/0133813 A1 6/2007 Morishima
2017/0118571 A1 4/2017 Peng et al.
2018/0302711 A1 10/2018 Katayama
2019/0387320 A1 12/2019 Sakai

FOREIGN PATENT DOCUMENTS

CN 107948792 A 4/2018
CN 108737948 A 11/2018
TW 201715380 A 5/2017

OTHER PUBLICATIONS

OA letter of a counterpart TW application (appl. No. 110139949) mailed on Jul. 26, 2023, 8 pages.
OA letter of a counterpart TW application (appl. No. 110139949) mailed on Aug. 23, 2022.

*Primary Examiner* — Ping Lee
(74) *Attorney, Agent, or Firm* — WPAT, PC

(57) ABSTRACT

An audio control device and a method of controlling a multi-channel sound system are provided. The audio control device is configured to control the audio output of a multimedia device which includes a first and a second sound receiving devices. The audio control device includes an audio output port and a control circuit which performs the following steps: (A) controlling a test signal to be outputted from the audio output port at a first time point; (B) receiving a first input signal generated by the first sound receiving device, and recording a second time point; (C) receiving a second input signal generated by the second sound receiving device, and recording a third time point; and (D) calculating a speaker position according to the first time point, the second time point, the third time point, and a distance between the first sound receiving device and the second sound receiving device.

6 Claims, 13 Drawing Sheets

AUDIO CONTROL DEVICE AND METHOD OF CONTROLLING MULTI-CHANNEL SOUND SYSTEM

BACKGROUND OF THE INVENTION

1. Field of the Invention

The present invention generally relates to multimedia, and, more particularly, to audio control of multi-channel sound systems.

2. Description of Related Art

A multi-channel sound system usually includes a console (e.g., devices with audio processing capabilities, such as a television (TV), amplifier, soundbar, etc.) and several speakers. Multi-channel sound systems are generally backward compatible, for example, a 7.1-channel sound system can also output a 5.1-channel audio or a 2.1-channel audio. The conventional multi-channel sound system has the following disadvantages: (1) failing to automatically detect the number of speakers and output the audio of the corresponding number of channels; for example, the console should output the 2.1-channel audio, rather than the 5.1-channel or 7.1-channel audio when only two speakers are connected; (2) failing to know whether the speakers are plugged into the correct audio jacks; for example, the sound system cannot know that the left (or right) speaker is connected to the right (or left) audio jack, and/or the front (or rear) speaker is connected to rear (or front) audio jack; (3) failing to know whether the speakers are placed in a better position; the positions of the speakers are crucial to the user experience.

If the multi-channel sound system can detect the number of speakers connected to the console, or detect the positions of the speakers, at least one of the above problems can be solved.

SUMMARY OF THE INVENTION

In view of the issues of the prior art, an object of the present invention is to provide an audio control device and a method of controlling a multi-channel sound system, so as to make an improvement to the prior art.

According to one aspect of the present invention, an audio control device is provided. The audio control device is configured to control audio output of a multimedia device. The multimedia device includes a sound receiving device. The audio control device includes a first audio output port, a second audio output port, and a control circuit. The control circuit is configured to perform the following steps: (A) controlling a test signal to be outputted from the first audio output port; (B) receiving an input signal generated by the sound receiving device; (C) updating a count value according to the test signal and the input signal; (D) controlling the second audio output port to output the test signal; (E) receiving the input signal generated by the sound receiving device; (F) updating the count value according to the test signal and the input signal; and (G) determining a total number of speakers connected to the multimedia device according to the count value.

According to another aspect of the present invention, a method of controlling a multi-channel sound system is provided. The multi-channel sound system includes a multimedia device which includes a sound receiving device, a first audio output port, and a second audio output port. The method includes the following steps: (A) controlling a test signal to be outputted from the first audio output port; (B) receiving an input signal generated by the sound receiving device; (C) updating a count value according to the test signal and the input signal; (D) controlling the second audio output port to output the test signal; (E) receiving the input signal generated by the sound receiving device; (F) updating the count value according to the test signal and the input signal; and (G) determining a total number of speakers connected to the multimedia device according to the count value.

According to still another aspect of the present invention, an audio control device is provided. The audio control device is configured to control audio output of a multimedia device. The multimedia device includes a first sound receiving device and a second sound receiving device. The audio control device includes an audio output port and a control circuit. The control circuit is configured to perform the following steps: (A) controlling a test signal to be outputted from the audio output port at a first time point; (B) receiving a first input signal generated by the first sound receiving device, and recording a second time point; (C) receiving a second input signal generated by the second sound receiving device, and recording a third time point; and (D) calculating a speaker position according to the first time point, the second time point, the third time point, and a distance between the first sound receiving device and the second sound receiving device.

According to still another aspect of the present invention, a method of controlling a multi-channel sound system is provided. The multi-channel sound system includes a first sound receiving device, a second sound receiving device, and an audio output port. The method includes the following steps: (A) controlling a test signal to be outputted from the audio output port at a first time point; (B) receiving a first input signal generated by the first sound receiving device, and recording a second time point; (C) receiving a second input signal generated by the second sound receiving device, and recording a third time point; and (D) calculating a speaker position according to the first time point, the second time point, the third time point, and a distance between the first sound receiving device and the second sound receiving device.

The audio control device of the present invention can detect the number of speakers and/or the positions of the speakers. Compared with the prior art, the present invention can improve the user experience by outputting the correct number of audio channels, correctly outputting the audio to the corresponding speaker, recommending the user a better position to place the speaker, and/or fine-tuning the output time of the audio.

These and other objectives of the present invention no doubt become obvious to those of ordinary skill in the art after reading the following detailed description of the preferred embodiments with reference to the various figures and drawings.

DETAILED DESCRIPTION OF THE EMBODIMENTS

The following description is written by referring to terms of this technical field. If any term is defined in this specification, such term should be interpreted accordingly. In addition, the connection between objects or events in the below-described embodiments can be direct or indirect provided that these embodiments are practicable under such connection. Said "indirect" means that an intermediate object or a physical space exists between the objects, or an intermediate event or a time interval exists between the events.

The disclosure herein includes audio control devices and methods of controlling multi-channel sound systems. On account of that some or all elements of the audio control device could be known, the detail of such elements is omitted provided that such detail has little to do with the features of this disclosure, and that this omission nowhere dissatisfies the specification and enablement requirements. A person having ordinary skill in the art can choose components or steps equivalent to those described in this specification to carry out the present invention, which means that the scope of this invention is not limited to the embodiments in the specification.

Figure 1:
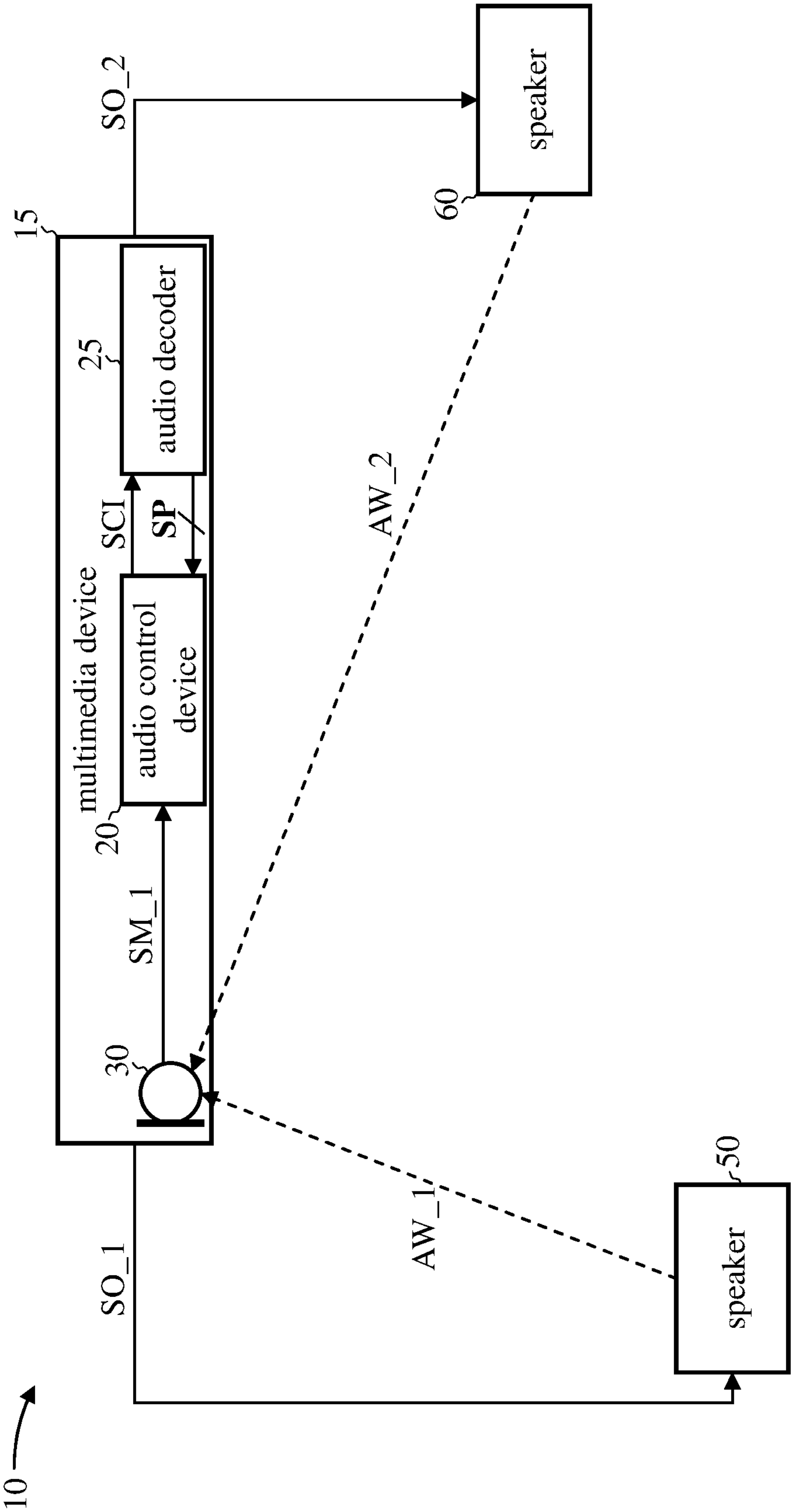
FIG. 1 is a schematic diagram of a multi-channel sound system according to an embodiment of the present invention.

FIG. 1 is a schematic diagram of a multi-channel sound system according to an embodiment of the present invention. The multi-channel sound system 10 includes a multimedia device 15, a speaker 50, and a speaker 60. The multimedia device 15 includes an audio control device 20, an audio decoder 25, and a sound receiving device 30. The multimedia device 15 may be a device with audio processing capability, such as a TV, amplifier, or soundbar. The sound receiving device 30 may be a microphone. The multimedia device 15 can transmit the output signal SO_1 to the speaker 50 and the output signal SO_2 to the speaker 60. The sound receiving device 30 receives the sound signal AW_1 (e.g., sound wave) that the speaker 50 generates and/or the sound signal AW_2 that the speaker 60 generates, and generates the input signal SM_1. The audio control device 20 receives the input signal SM_1 and controls the audio decoder 25.

Figure 2:
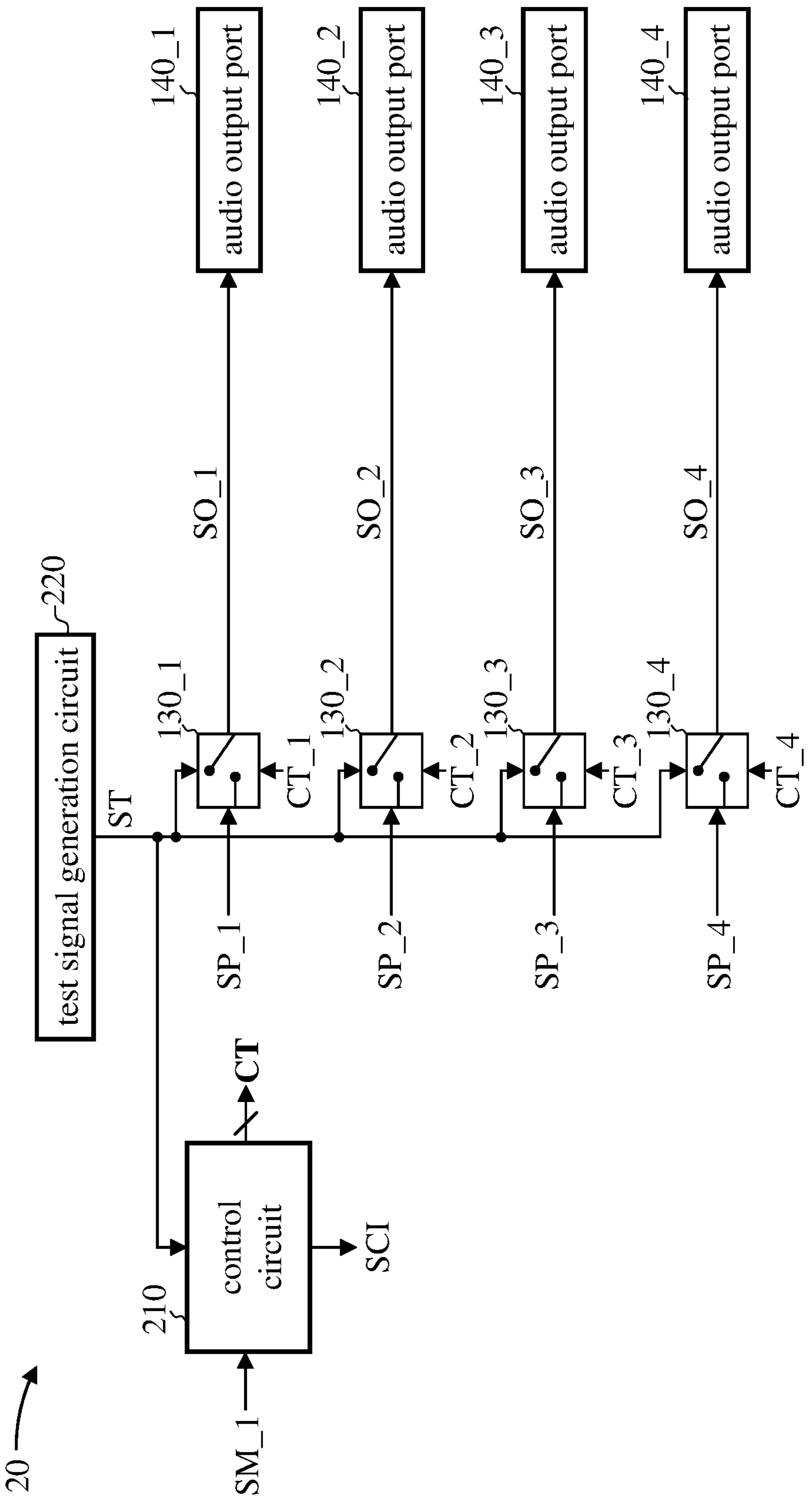
FIG. 2 is a functional block diagram of an audio control device according to an embodiment of the present invention.

FIG. 2 is a functional block diagram of an audio control device according to an embodiment of the present invention. The audio control device 20 includes a control circuit 210, a test signal generation circuit 220, multiple switches (including a switch 130_1, a switch 130_2, a switch 130_3, and a switch 130_4), and multiple audio output ports (including an audio output port 140_1, an audio output port 140_2, an audio output port 140_3, and an audio output port 140_4). Note that the four switches and the four audio output ports are for illustrative purposes only, not for limiting the present invention. In some embodiments, the audio control device 20 may include less or more switches and audio output ports. The test signal generation circuit 220 is configured to generate the test signal ST, which may be a signal of a specific frequency.

In some embodiments, the audio control device 20 is a chip or integrated circuit (IC), and the audio output port may be a pad of the chip or IC. The audio output port 140_1, the audio output port 140_2, the audio output port 140_3, and the audio output port 140_4 are respectively used for outputting the output signal SO_1, the output signal SO_2, the output signal SO_3, and the output signal SO_4.

One switch corresponds to one audio output port. More specifically, the switch 130_1 (switch 130_2, switch 130_3, switch 130_4) decides, according to the switch control signal CT_1 (switch control signal CT_2, switch control signal CT_3, switch control signal CT_4), whether the output signal SO_1 (output signal SO_2, output signal SO_3, output signal SO_4) is the test signal ST or the playback signal SP_1 (playback signal SP_2, playback signal SP_3, playback signal SP_4). The playback signal SP_1, the playback signal SP_2, the playback signal SP_3, and the playback signal SP_4 (collectively, the playback signal SP) are generated outside the audio control device 20, for example, the outcome that the audio decoder 25 outputs when decoding the audio signal(s) (not shown). The switch control signal CT_1, the switch control signal CT_2, the switch control signal CT_3, and the switch control signal CT_4 are collectively referred to as the switch control signal CT.

The control circuit 210 receives the input signal SM_1 and the test signal ST, and outputs the switch control signal CT and the channel quantity indication signal SCI.

In some embodiments, the control circuit 210 may be embodied by a finite-state machine (FSM).

In other embodiments, the control circuit 210 is a circuit or electronic component with program execution capability and includes a memory (not shown), and the control circuit 210 carries out the functions of the control circuit 210 by executing program codes or program instructions stored in the memory.

Figure 3:
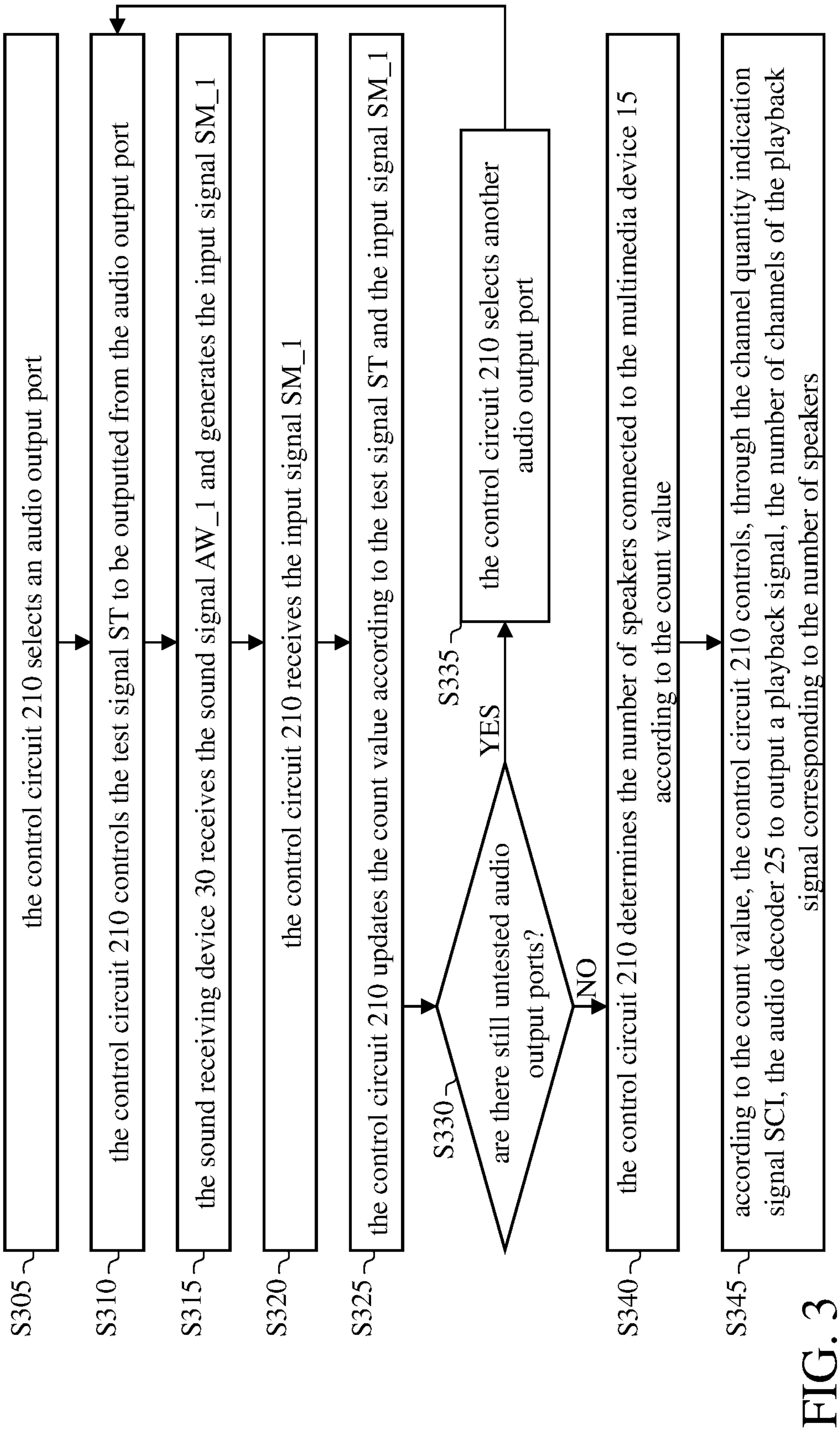
FIG. 3 is a flowchart of detecting the number of speakers according to an embodiment of the present invention.

FIG. 3 is a flowchart of detecting the number of speakers according to an embodiment of the present invention. The flow includes the following steps. In the following discussions, it is assumed that the speaker 50 is connected to the audio output port 140_1 and the speaker 60 to the audio output port 140_2.

Step S305: The control circuit 210 selects an audio output port, for example, the audio output port 140_1.

Step S310: The control circuit 210 controls the test signal ST to be outputted from the selected audio output port. More specifically, taking the audio output port 140_1 as an example, the control circuit 210 controls, through the switch control signal CT_1, the switch 130_1 to switch to the test signal ST instead of the playback signal SP_1; thus, the output signal SO_1 is the test signal ST. As a result, the sound signal AW_1 produced by the speaker 50 corresponds to the test signal ST (e.g., corresponding to the frequency of the test signal ST). In some embodiments, the frequency of the test signal ST may be less than 20 Hz or greater than 20000 Hz, rendering the sound signal AW_1 inaudible to the user.

Step S315: The sound receiving device 30 receives the sound signal AW_1 and generates the input signal SM_1.

Step S320: The control circuit 210 receives the input signal SM_1.

Step S325: The control circuit 210 updates the count value according to the test signal ST and the input signal SM_1. More specifically, after confirming that the frequency of the input signal SM_1 is substantially equal to the frequency of the test signal ST, the control circuit 210 determines that the audio output port 140_1 is connected to the speaker and updates the count value accordingly (e.g., increase the count value by one). The count value can represent the number of speakers.

Step S330: The control circuit 210 determines whether there are still untested audio output ports. If the control circuit 210 has not tested all the audio output ports, the control circuit 210 performs step S335; if the control circuit 210 has tested all the audio output ports, the control circuit 210 performs step S340.

Step S335: The control circuit 210 selects another audio output port that has not been tested, and then the control circuit 210 performs step S310.

Step S340: The control circuit 210 determines the number of speakers connected to the multimedia device according to the count value. In some embodiments, the initial value of the count value is zero, and the control circuit 210 increases the count value by one each time a speaker is detected. Therefore, the count value represents the number of speakers connected to the multimedia device.

Step S345: The control circuit 210 controls, according to the count value and through the channel quantity indication signal SCI, the audio decoder 25 to output a playback signal; the number of channels of the playback signal corresponds to the number of speakers. For example, if the number of speakers is two, the control circuit 210 controls the audio decoder 25 to output 2-channel playback signals (e.g., the playback signal SP_1 and the playback signal SP_2).

Figure 4:
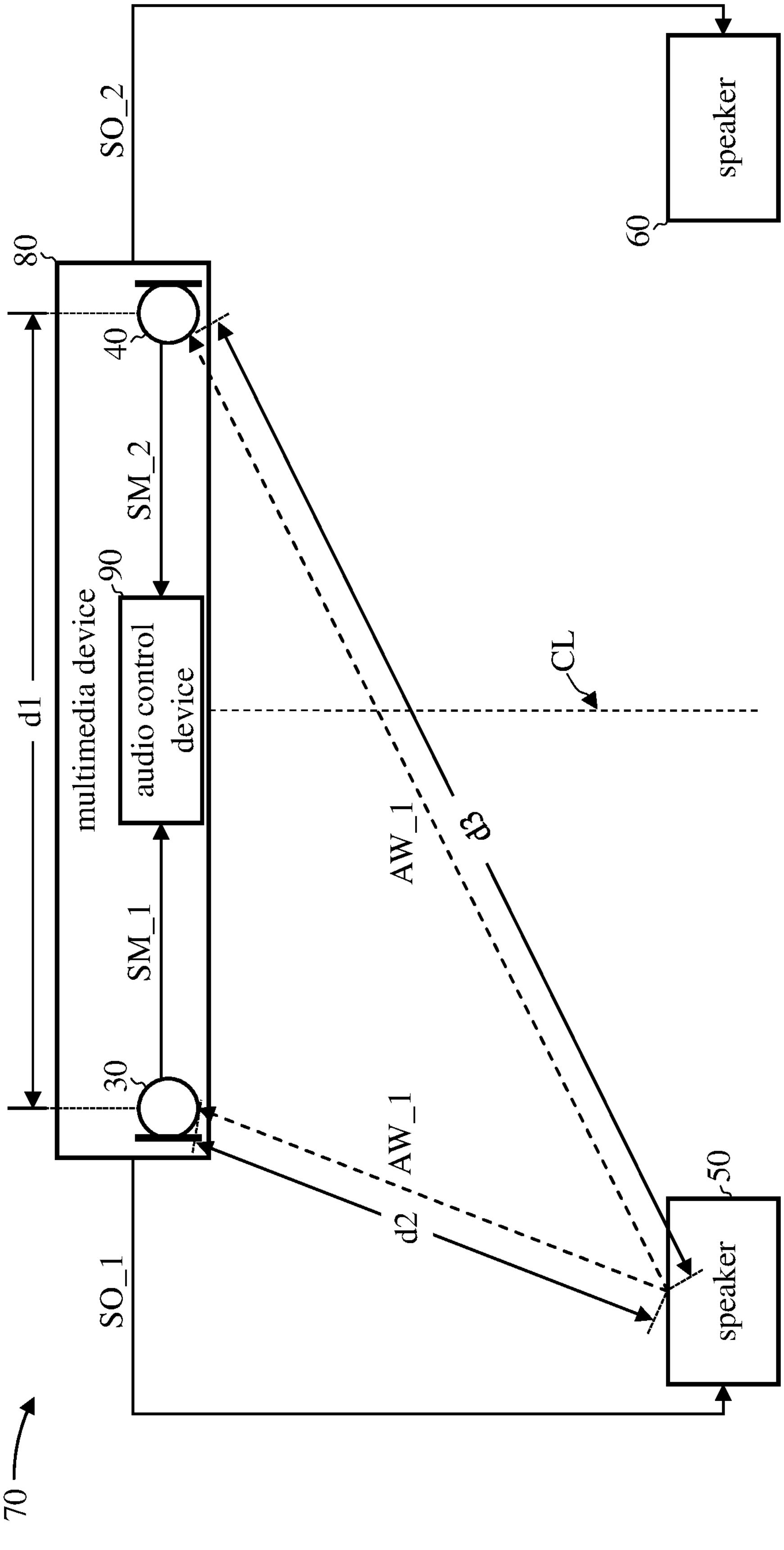
FIG. 4 is a schematic diagram of a multi-channel sound system according to another embodiment of the present invention.

FIG. 4 is a schematic diagram of a multi-channel sound system according to another embodiment of the present invention. The multi-channel sound system 70 includes a multimedia device 80, the speaker 50, and the speaker 60. The multimedia device 80 includes an audio control device 90, the sound receiving device 30, and a sound receiving device 40. The multimedia device 80 may be a device with audio processing capability, such as a TV, amplifier, or soundbar. The sound receiving device 30 and the sound receiving device 40 may be microphones. The multimedia device 80 can transmit the output signal SO_1 to the speaker 50 and the output signal SO_2 to the speaker 60. The sound receiving device 30 and the sound receiving device 40 receive the sound signal AW_1 produced by the speaker 50, and respectively generate the input signal SM_1 and the input signal SM_2. The audio control device 90 receives the input signal SM_1 and the input signal SM_2. The distance between the sound receiving device 30 and the sound receiving device 40 is d1, which is set or known beforehand.

Figure 5:
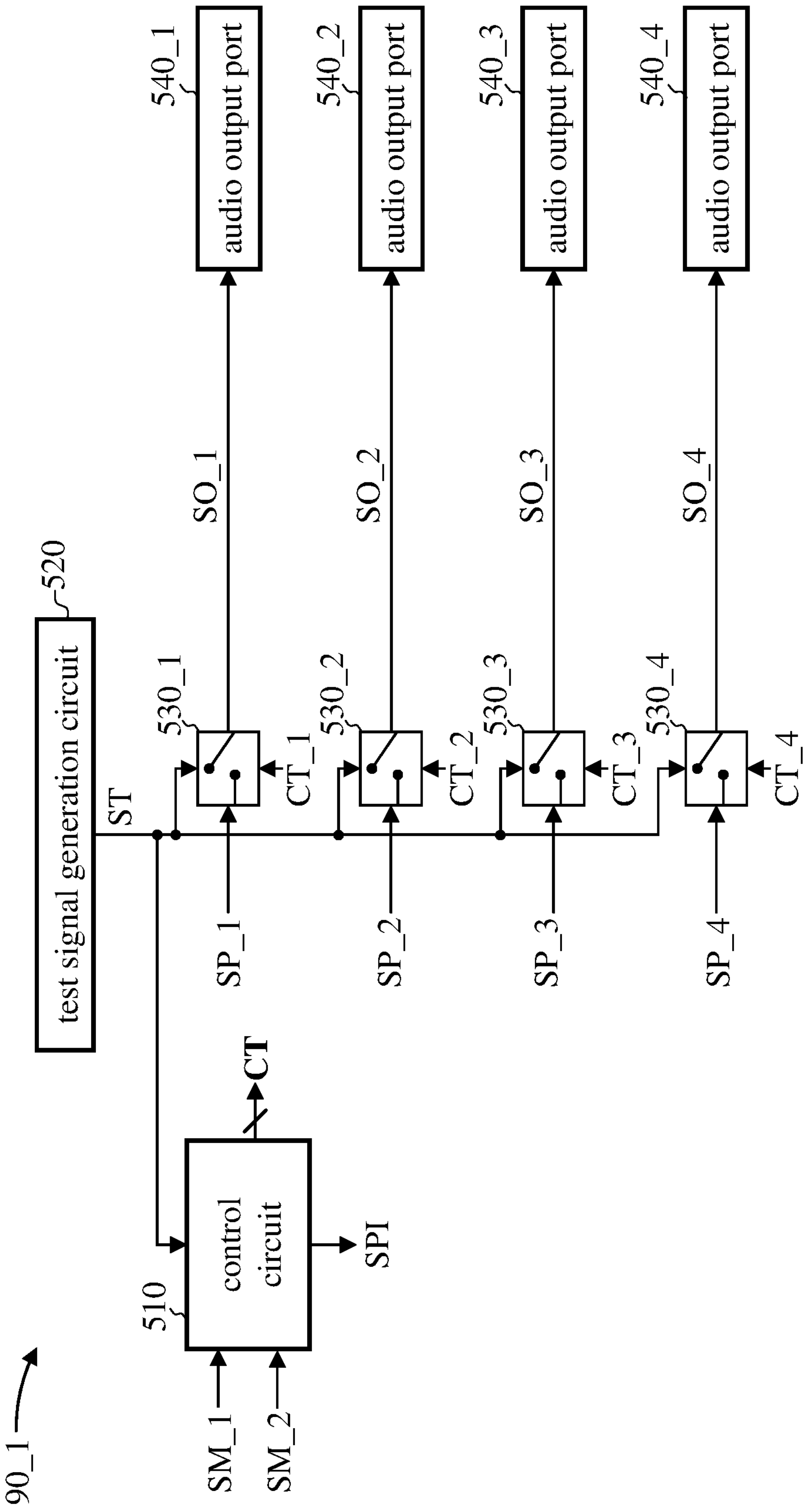
FIG. 5 is a functional block diagram of an audio control device according to another embodiment of the present invention.

FIG. 5 is a functional block diagram of an audio control device according to another embodiment of the present invention. The audio control device 90_1 is an embodiment of the audio control device 90 of FIG. 4 and includes a control circuit 510, a test signal generation circuit 520, multiple switches (including a switch 530_1, a switch 530_2, a switch 530_3, and a switch 530_4) and multiple audio output ports (including an audio output port 540_1, an audio output port 540_2, an audio output port 540_3, and an audio output port 540_4). In some embodiments, the audio control device 90_1 may include less or more switches and audio output ports. In some embodiments, the audio control device 90_1 is a chip or IC, and the audio output port may be a pad of the chip or IC. The audio output port 540_1, the audio output port 540_2, the audio output port 540_3, and the audio output port 540_4 are configured to output the output signal SO_1, the output signal SO_2, the output signal SO_3, and the output signal SO_4, respectively. The function of the test signal generation circuit 520 is the same as that of the test signal generation circuit 220.

In some embodiments, the control circuit 510 may be embodied by an FSM.

In other embodiments, the control circuit 510 is a circuit or electronic component with program execution capability and includes a memory (not shown), and the control circuit 510 carries out the functions of the control circuit 510 by executing program codes or program instructions stored in the memory.

Figure 6:
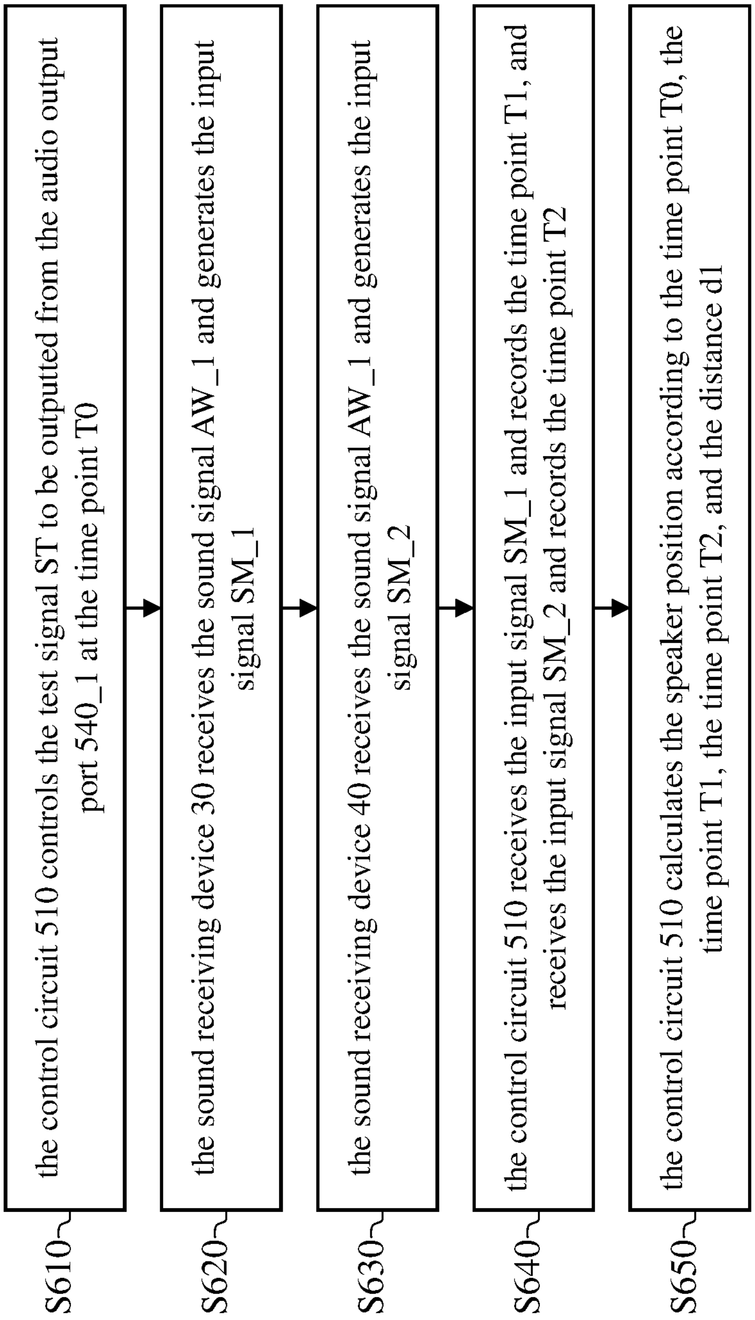
FIG. 6 is a flowchart of detecting the positions of the speakers according to an embodiment of the present invention.

FIG. 6 is a flowchart of detecting the positions of the speakers according to an embodiment of the present invention. Reference is made to FIG. 4, FIG. 5, and FIG. 6 for the following discussions. In the following discussions, it is assumed that the speaker 50 is connected to the audio output port 540_1 and the speaker 60 to the audio output port 540_2.

Step S610: The control circuit 510 controls the test signal ST to be outputted from the audio output port 540_1 at the time point TO. More specifically, the control circuit 510 controls, through the switch control signal CT_1, the switch 530_1 to output the test signal ST, so that the test signal ST is outputted through the audio output port 540_1 (in this instance, the output signal SO_1 is the test signal ST).

Step S620: The sound receiving device 30 receives the sound signal AW_1 and generates the input signal SM_1.

Step S630: The sound receiving device 40 receives the sound signal AW_1 and generates the input signal SM_2.

Step S640: The control circuit 510 receives the input signal SM_1 and records the time point T1 at which the input signal SM_1 is received, and receives the input signal SM_2 and records the time point T2 at which the input signal SM_2 is received.

Step S650: The control circuit 510 calculates the speaker position according to the time point T0, the time point T1, the time point T2, and the distance d1. Please refer to FIG. 4 for the detail. Because the speed of sound is substantially constant at room temperature (about 340 M/s), and the transmission time of the test signal ST (i.e., the time the signal travels from the multimedia device 80 to the speaker 50) is much smaller than the transmission time of the sound signal AW_1 in the air, the control circuit 510 can know the distance d2=340×(T1−T0) between the speaker 50 and the sound receiving device 30 and the distance d3=340×(T2−T0) between the speaker 50 and the sound receiving device 40. The control circuit 510 then calculates the speaker position (i.e., the position of the speaker 50) based on the distance d1, the distance d2, and the distance d3.

Figure 7:
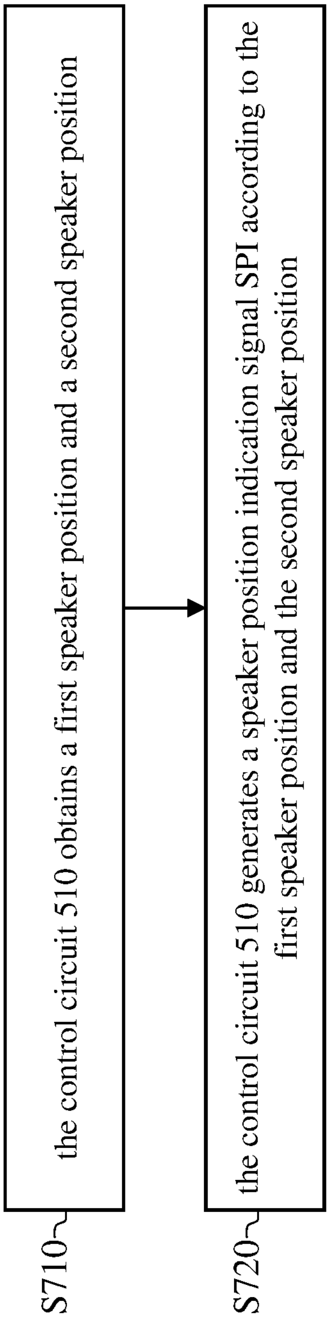
FIG. 7 is a flowchart of a method of prompting speaker placement position(s) according to an embodiment of the present invention.

FIG. 7 is a flowchart of a method of prompting speaker placement position(s) according to an embodiment of the present invention. Reference is made to FIG. 4, FIG. 5, and FIG. 7 for the following discussions.

Step S710: The control circuit 510 obtains a first speaker position (e.g., the position of the speaker 50) and a second speaker position (e.g., the position of the speaker 60). In some embodiments, the speaker position can be obtained based on the process of FIG. 6; specifically, the control circuit 510 performs the process of FIG. 6 twice to obtain the position of the speaker 50 and the position of the speaker 60, respectively.

Step S720: The control circuit 510 generates a speaker position indication signal SPI according to the first speaker position and the second speaker position; the speaker position indication signal SPI indicates the place where the speaker should be placed. More specifically, in general, users have a better user experience when sitting in the middle of the two speakers; therefore, the control circuit 510 can suggest the positions to place the speakers based on the first speaker position, the second speaker position, and the central position CL of the multi-channel sound system. For example, when the speaker 50 is closer to the central position CL than the speaker 60, the control circuit 510 may suggest, through the speaker position indication signal SPI, adjusting the position of the speaker 50 and/or the position of the speaker 60, so that the speaker 50 and the speaker 60 will be symmetrical with respect to the central position CL. In some embodiments, the speaker position indication signal SPI is a sound signal outputted by the speaker 50 and/or the speaker 60. In other embodiments, the speaker position indication signal SPI is an image signal displayed by a display device (not shown) coupled to the audio control device 90.

Figure 8:
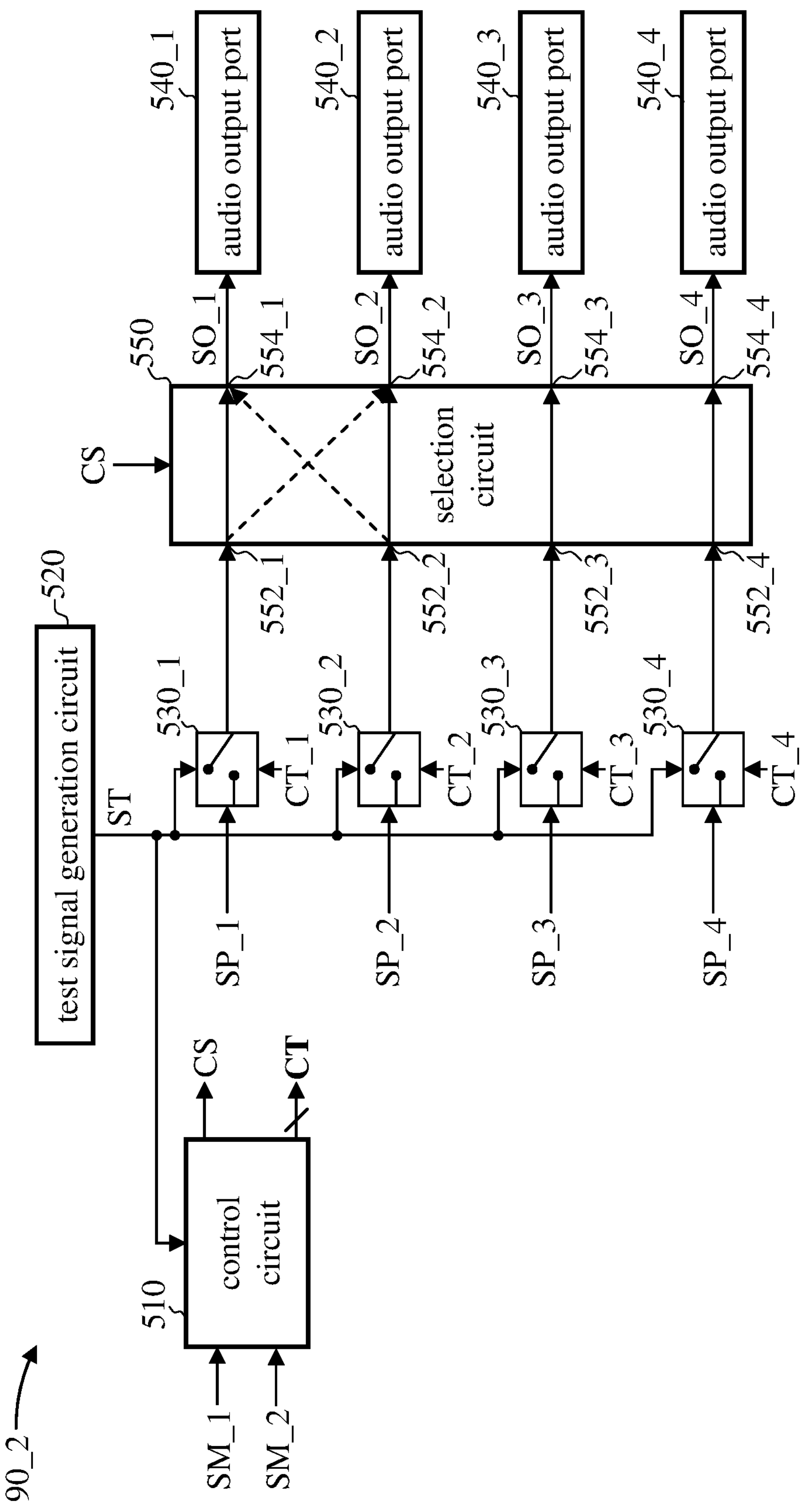
FIG. 8 is a functional block diagram of an audio control device according to another embodiment of the present invention.

FIG. 8 is a functional block diagram of the audio control device according to another embodiment of the present invention. The audio control device 90_2 is another embodiment of the audio control device 90 of FIG. 4. The audio control device 90_2 is similar to the audio control device 90_1 in FIG. 5, except that the audio control device 90_2 further includes a selection circuit 550. In some embodiments, the selection circuit 550 is embodied by switches.

The selection circuit 550 includes multiple input terminals (including an input terminal 552_1, an input terminal 552_2, an input terminal 552_3, and an input terminal 552_4) and multiple output terminals (including an output terminal 554_1, an output terminal 554_2, an output terminal 554_3, and an output terminal 554_4). The switch 530_1 is coupled to the input terminal 552_1, the switch 530_2 is coupled to the input terminal 552_2, the switch 530_3 is coupled to the input terminal 552_3, and the switch 530_4 is coupled to the input terminal 552_4. The output terminal 554_1 is coupled to the audio output port 540_1, the output terminal 554_2 is coupled to the audio output port 540_2, the output terminal 554_3 is coupled to the audio output port 540_3, and the output terminal 554_4 is coupled to the audio output port 540_4.

The selection circuit 550 controls the connections between the input terminals and the output terminals according to the selection circuit control signal CS. In other words, the control circuit 510 can control the mapping between the output signals (SO_1, SO_2, SO_3, SO_4) and the playback signals (SP_1, SP_2, SP_3, SP_4) through the selection circuit control signal CS. In some embodiments, in a default state, the input terminal 552_1 is connected to the output terminal 554_1, the input terminal 552_2 is connected to the output terminal 554_2, the input terminal 552_3 is connected to the output terminal 554_3, and the input terminal 552_4 is connected to the output terminal 554_4 (as indicated by the solid arrows). That is, in the default state, the playback signal SP_1 is outputted from the audio output port 540_1, the playback signal SP_2 is outputted from the audio output port 540_2, the playback signal SP_3 is outputted from the audio output port 540_3, and the playback signal SP_4 is outputted from the audio output port 540_4.

Figure 9:
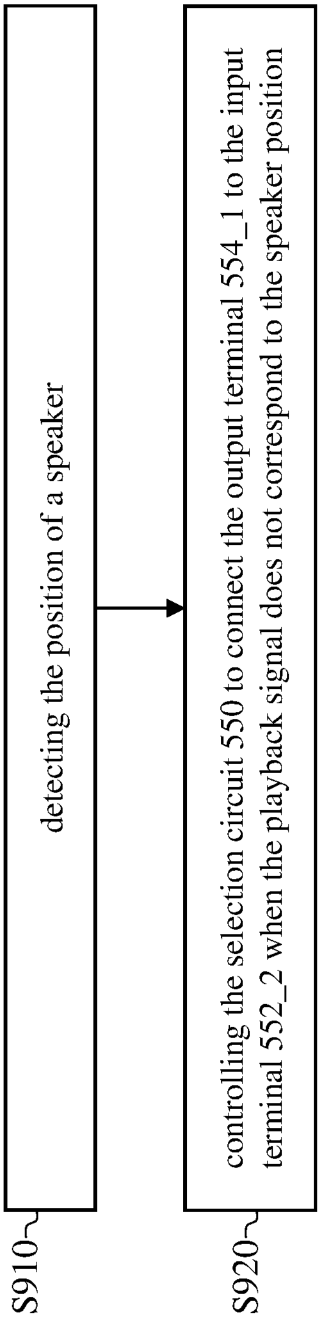
FIG. 9 is a flowchart of automatically assigning the playback signals according to an embodiment of the present invention.

FIG. 9 is a flowchart of automatically assigning the playback signals according to an embodiment the present invention. Reference is made to FIG. 4, FIG. 8, and FIG. 9 for the following discussions.

Step S910: The control circuit 510 detects the position of a speaker. In some embodiments, the speaker position may be obtained based on the process of FIG. 6.

Step S920: The control circuit 510 controls the selection circuit 550 to connect the output terminal 554_1 to the input terminal 552_2 when the playback signal does not correspond to the speaker position. Specifically, because the audio sources that are inputted to the input terminal 552_1 and the input terminal 552_2 are fixed (i.e., the playback signal SP_1 and the playback signal SP_2, respectively), and the audio output port 540_1 is coupled to the output terminal 554_1, the control circuit 510 can control the selection circuit 550 according to the position of the speaker 50 and the playback signal outputted by the speaker 50 so that the speaker 50 outputs the correct channel. For example, when the control circuit 510 knows that the speaker 50 is on the right, but the playback signal SP_1 that the speaker 50 is outputting is the left channel, the control circuit 510 controls the output terminal 554_1 to connect to the input terminal 552_2 (as indicated by the dotted arrow, where it is assumed that the playback signal SP_2 is the right channel). As a result, the multi-channel sound system 70 can output the sounds via their respective corresponding speaker. That is to say, even if the user does not connect the speakers with the audio jacks correctly, the multi-channel sound system 70 can still output the sounds correctly.

Figure 10:
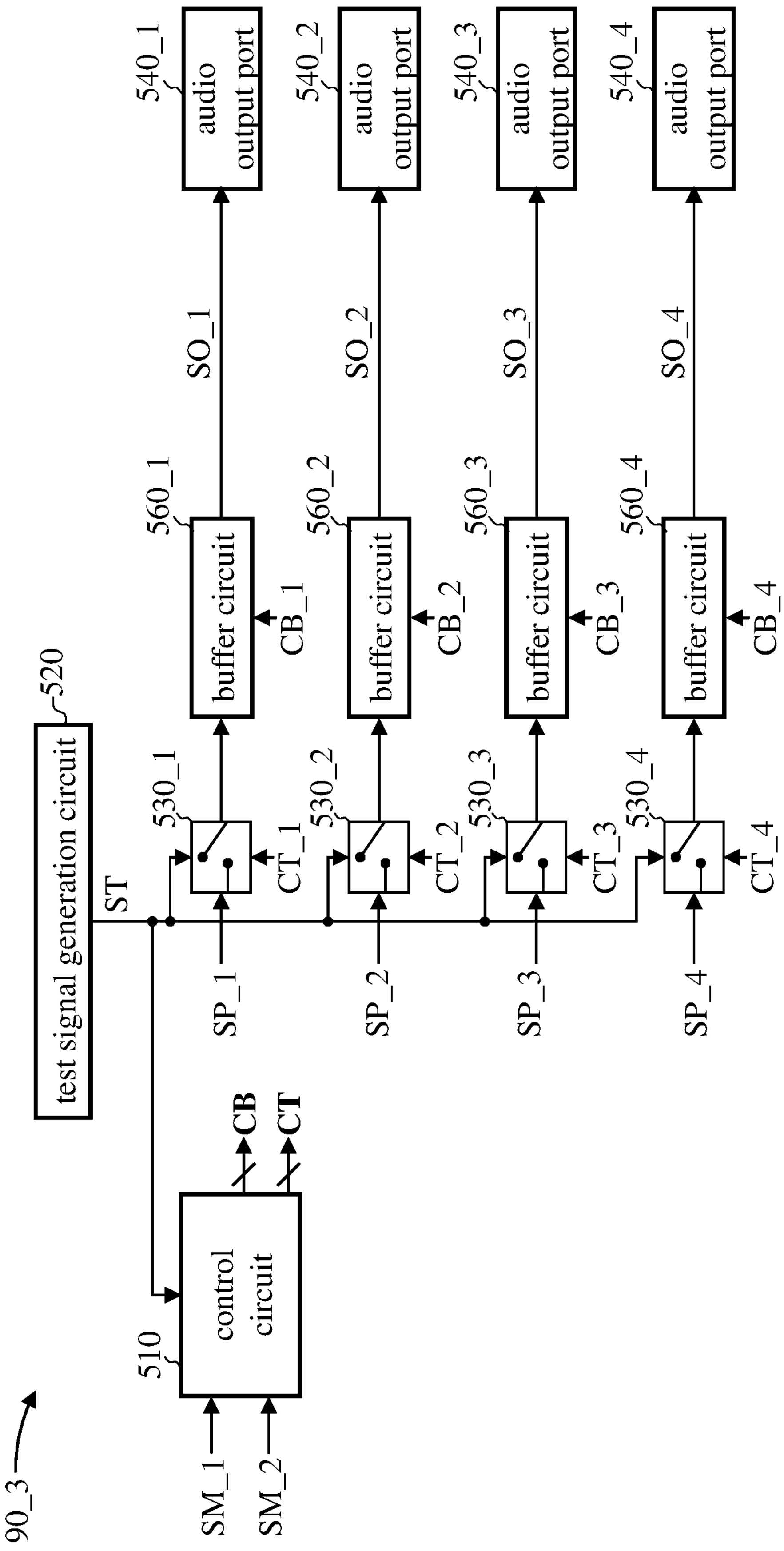
FIG. 10 is a functional block diagram of an audio control device according to another embodiment of the present invention.

FIG. 10 is a functional block diagram of the audio control device according to another embodiment of the present invention. The audio control device 90_3 is another embodiment of the audio control device 90 of FIG. 4. The audio control device 90_3 is similar to the audio control device 90_1 of FIG. 5, except that the audio control device 90_3 further includes multiple buffer circuits (including a buffer circuit 560_1, a buffer circuit 560_2, a buffer circuit 560_3, and a buffer circuit 560_4, which are configured to delay the playback signal SP_1, the playback signal SP_2, the playback signal SP_3, and the playback signal SP_4 respectively). The delay time of the buffer circuit 560_1, the buffer circuit 560_2, the buffer circuit 560_3, and the buffer circuit 560_4 are respectively controlled by the delay control signal CB_1, the delay control signal CB_2, the delay control signal CB_3, and the delay control signal CB_4 (collectively, the delay control signal CB) that are generated by the control circuit 510. In some embodiments, the delay control signal CB is used to set a register value of the buffer circuit, and the register value is associated with the delay time.

Figure 11:
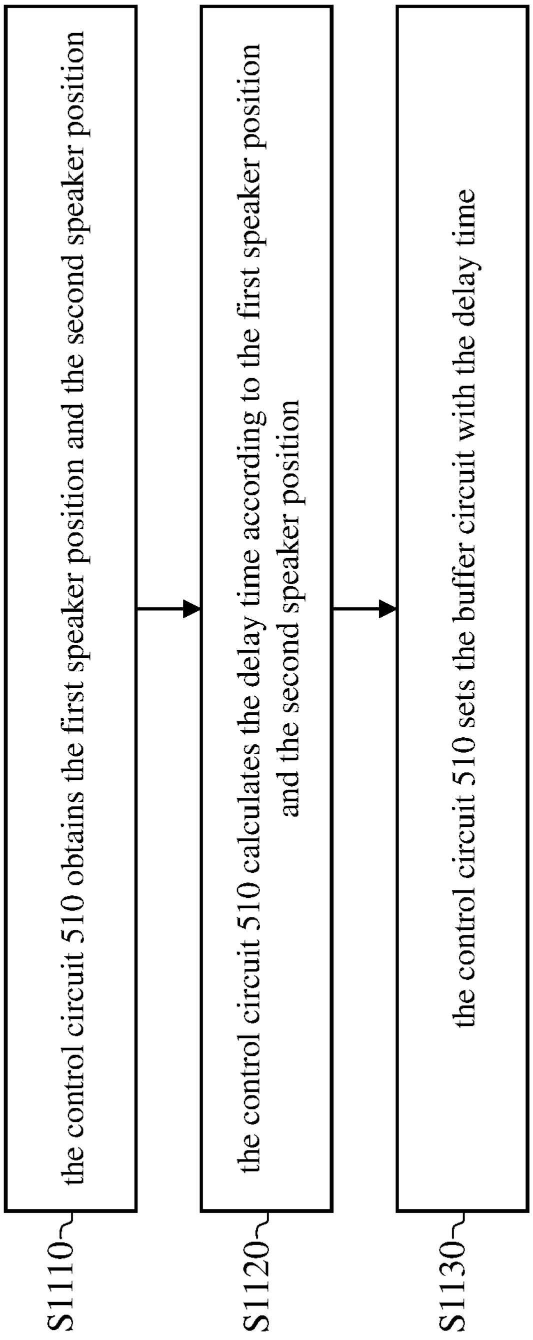
FIG. 11 is a flowchart of delaying the playback signals according to the speaker positions according to an embodiment of the present invention.

FIG. 11 is a flowchart of delaying the playback signal according to the speaker position according to an embodiment of the present invention. Reference is made to FIG. 4, FIG. 10, and FIG. 11 for the following discussions. In the following discussions, it is assumed that the speaker 50 is connected to the audio output port 540_1 and the speaker 60 to the audio output port 540_2.

Step S1110: The control circuit 510 obtains the first speaker position (e.g., the position of the speaker 50) and the second speaker position (e.g., the position of the speaker 60). This step is similar to step S710.

Step S1120: The control circuit 510 calculates the delay time according to the first speaker position and the second speaker position. Specifically, the control circuit 510 can calculate the time tx that the sound signal emitted by the speaker 50 takes to reach the central position CL (which is assumed to be the location of the user) according to the position of the speaker 50, the central position CL, and the speed of sound, calculate the time ty that the sound signal emitted by the speaker 60 takes to reach the central position CL according to the position of the speaker 60, the central position CL, and the speed of sound, and then the delay time $|tx-ty|$ can be obtained.

Step S1130: The control circuit 510 sets the buffer circuit with the delay time. For example, when the speaker 50 is closer to the central position CL than the speaker 60, the control circuit 510 controls the buffer circuit 560_1 to delay the playback signal SP_1 by approximately the delay time $|tx-ty|$. This can improve user experience, because even if the speakers 50 and 60 are not symmetrical with respect to the central position CL, the user at the central position CL can still feel that the left channel and the right channel are balanced.

Figure 12:
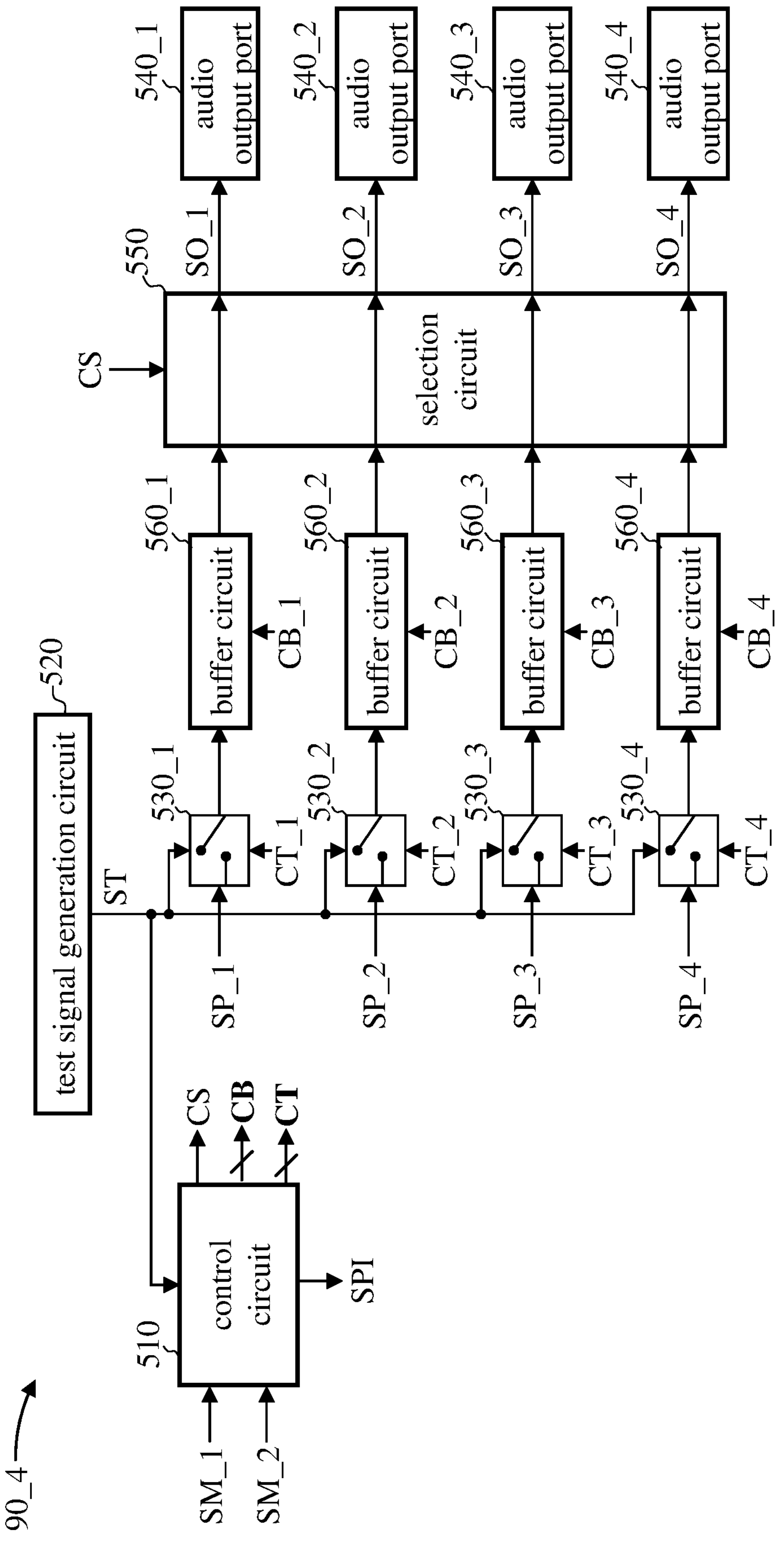
FIG. 12 is a functional block diagram of an audio control device according to another embodiment of the present invention.
Figure 13:
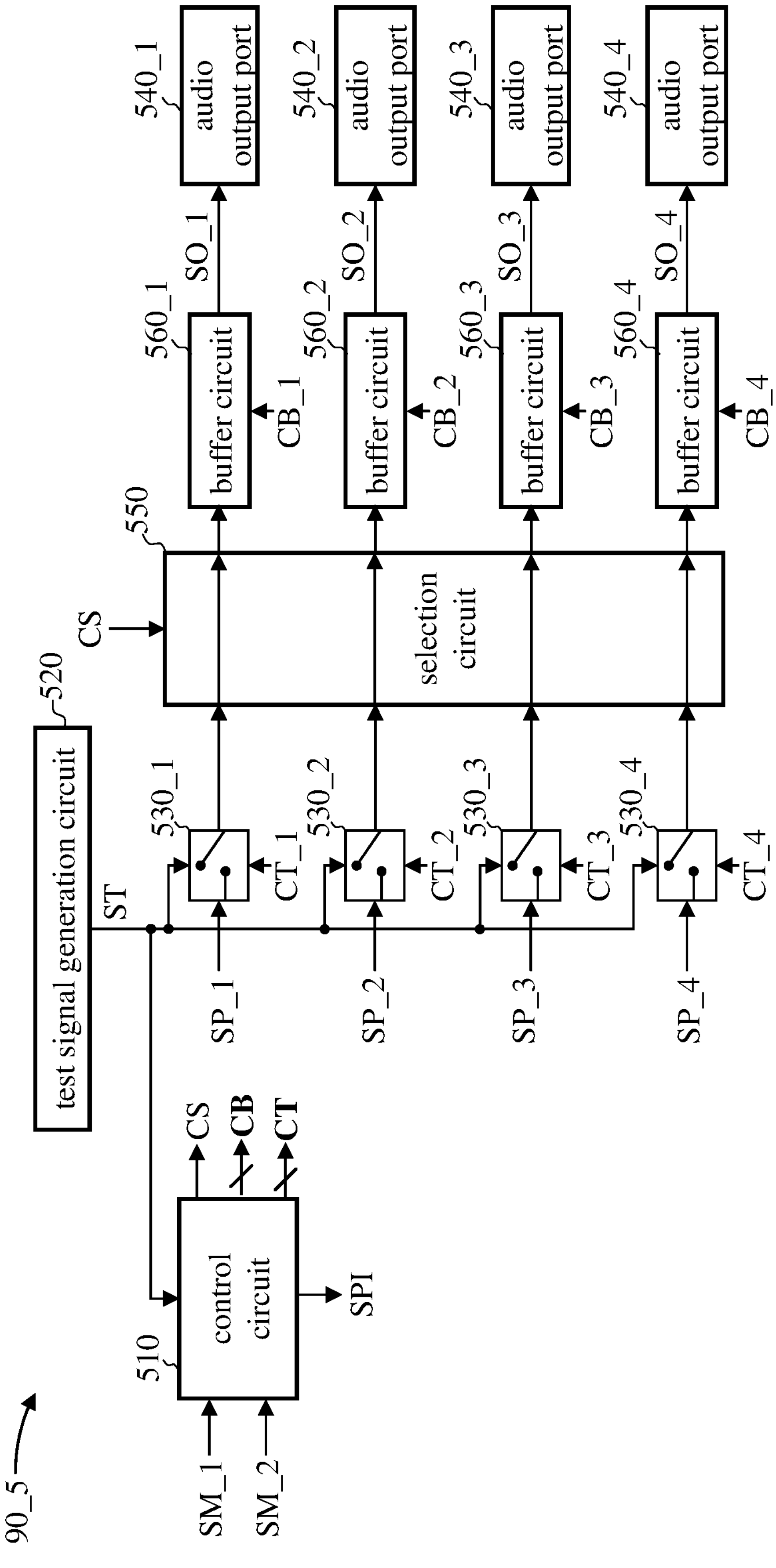
FIG. 13 is a functional block diagram of an audio control device according to another embodiment of the present invention.

FIGS. 12 and 13 respectively show a functional block diagram of the audio control device according to another embodiment of the present invention. The audio control device 90_4 and the audio control device 90_5 are other embodiments of the audio control device 90 of FIG. 4. The audio control device 90_4 and the audio control device 90_5 are the combination of the audio control device 90_1, the audio control device 90_2, and the audio control device 90_3 discussed above. In other words, the audio control device 90_4 and the audio control device 90_5 may be used to perform some or all of the steps in FIGS. 6, 7, 9, and 11. The audio control device 90_4 and the audio control device 90_5 are similar, except that the positions of the selection circuit 550 and the buffer circuits are changed.

Since a person having ordinary skill in the art can appreciate the implementation detail and the modification thereto of the present method invention through the disclosure of the device invention, repeated and redundant description is thus omitted. Please note that the shape, size, and ratio of any element in the disclosed figures are exemplary for understanding, not for limiting the scope of this invention. Furthermore, there is no step sequence limitation for the method inventions as long as the execution of each step is applicable. In some instances, the steps can be performed simultaneously or partially simultaneously.

The aforementioned descriptions represent merely the preferred embodiments of the present invention, without any intention to limit the scope of the present invention thereto. Various equivalent changes, alterations, or modifications based on the claims of the present invention are all consequently viewed as being embraced by the scope of the present invention.

What is claimed is:

1. An audio control device configured to control audio output of a multimedia device which includes a first sound receiving device and a second sound receiving device, the audio control device comprising:

an audio output port outputting a playback signal;

a selection circuit comprising a first input terminal, a second input terminal, and an output terminal which is coupled to the audio output port and connected to the first input terminal; and a control circuit coupled to the selection circuit and configured to perform following steps:

(A) controlling a test signal to be outputted from the audio output port at a first time point;

(B) receiving a first input signal generated by the first sound receiving device, and recording a second time point;

(C) receiving a second input signal generated by the second sound receiving device, and recording a third time point;

(D) calculating a speaker position according to the first time point, the second time point, the third time point, and a distance between the first sound receiving device and the second sound receiving device; and (E) controlling the selection circuit automatically to connect the output terminal to the second input terminal when the playback signal does not correspond to the speaker position.

2. The audio control device of claim 1, wherein the audio output port is a first audio output port, the speaker position is a first speaker position, the audio control device further comprising:

a second audio output port;

wherein the control circuit further performs following steps:

(E) controlling the test signal to be outputted from the second audio output port at a fourth time point;

(F) receiving the first input signal, and recording a fifth time point;

(G) receiving the second input signal, and recording a sixth time point; and (H) calculating a second speaker position according to the fourth time point, the fifth time point, the sixth time point, and the distance; and (I) generating a speaker position indication signal according to the first speaker position and the second speaker position.

3. The audio control device of claim 1, wherein the audio output port is a first audio output port, the speaker position is a first speaker position, and the first audio output port outputs an output signal, the audio control device further comprising:

a second audio output port; and a buffer circuit configured to delay the output signal according to a delay time;

wherein the control circuit further performs following steps:

(E) controlling the test signal to be outputted from the second audio output port at a fourth time point;

(F) receiving the first input signal, and recording a fifth time point;

(G) receiving the second input signal, and recording a sixth time point;

(H) calculating a second speaker position according to the fourth time point, the fifth time point, the sixth time point, and the distance; and (I) calculating the delay time according to the first speaker position and the second speaker position.

4. A method of controlling a multi-channel sound system which comprises a first sound receiving device, a second sound receiving device, an audio output port outputting a playback signal, and a selection circuit which includes a first input terminal, a second input terminal, and an output terminal which is coupled to the audio output port, the method comprising:

(A) controlling a test signal to be outputted from the audio output port at a first time point;

(B) receiving a first input signal generated by the first sound receiving device, and recording a second time point;

(C) receiving a second input signal generated by the second sound receiving device, and recording a third time point;

(D) calculating a speaker position according to the first time point, the second time point, the third time point, and a distance between the first sound receiving device and the second sound receiving device; and (E) controlling the selection circuit automatically to connect the output terminal to the second input terminal when the playback signal does not correspond to the speaker position.

5. The method of claim 4, wherein the audio output port is a first audio output port, the speaker position is a first speaker position, and the multi-channel sound system further comprises a second audio output port, the method further comprising:

(E) controlling the test signal to be outputted from the second audio output port at a fourth time point;

(F) receiving the first input signal, and recording a fifth time point;

(G) receiving the second input signal, and recording a sixth time point;

(H) calculating a second speaker position according to the fourth time point, the fifth time point, the sixth time point, and the distance; and (I) generating a speaker position indication signal according to the first speaker position and the second speaker position.

6. The method of claim 4, wherein the audio output port is a first audio output port, the speaker position is a first speaker position, the first audio output port outputs an output signal, and the multi-channel sound system further comprises a second audio output port and a buffer circuit which is configured to delay the output signal according to a delay time, the method further comprising:

(E) controlling the test signal to be outputted from the second audio output port at a fourth time point;

(F) receiving the first input signal, and recording a fifth time point;

(G) receiving the second input signal, and recording a sixth time point; and (H) calculating a second speaker position according to the fourth time point, the fifth time point, the sixth time point, and the distance; and (I) calculating the delay time according to the first speaker position and the second speaker position.

* * * * *